Feb. 20, 1940.　　　　H. B. PALMER　　　　2,190,881
QUESTIONNAIRE GAME
Filed Sept. 29, 1938　　　2 Sheets-Sheet 1

Inventor
Harry B. Palmer
By Edw. F. Watson
Attorney

Feb. 20, 1940.　　　　H. B. PALMER　　　　2,190,881
QUESTIONNAIRE GAME
Filed Sept. 29, 1938　　　2 Sheets-Sheet 2
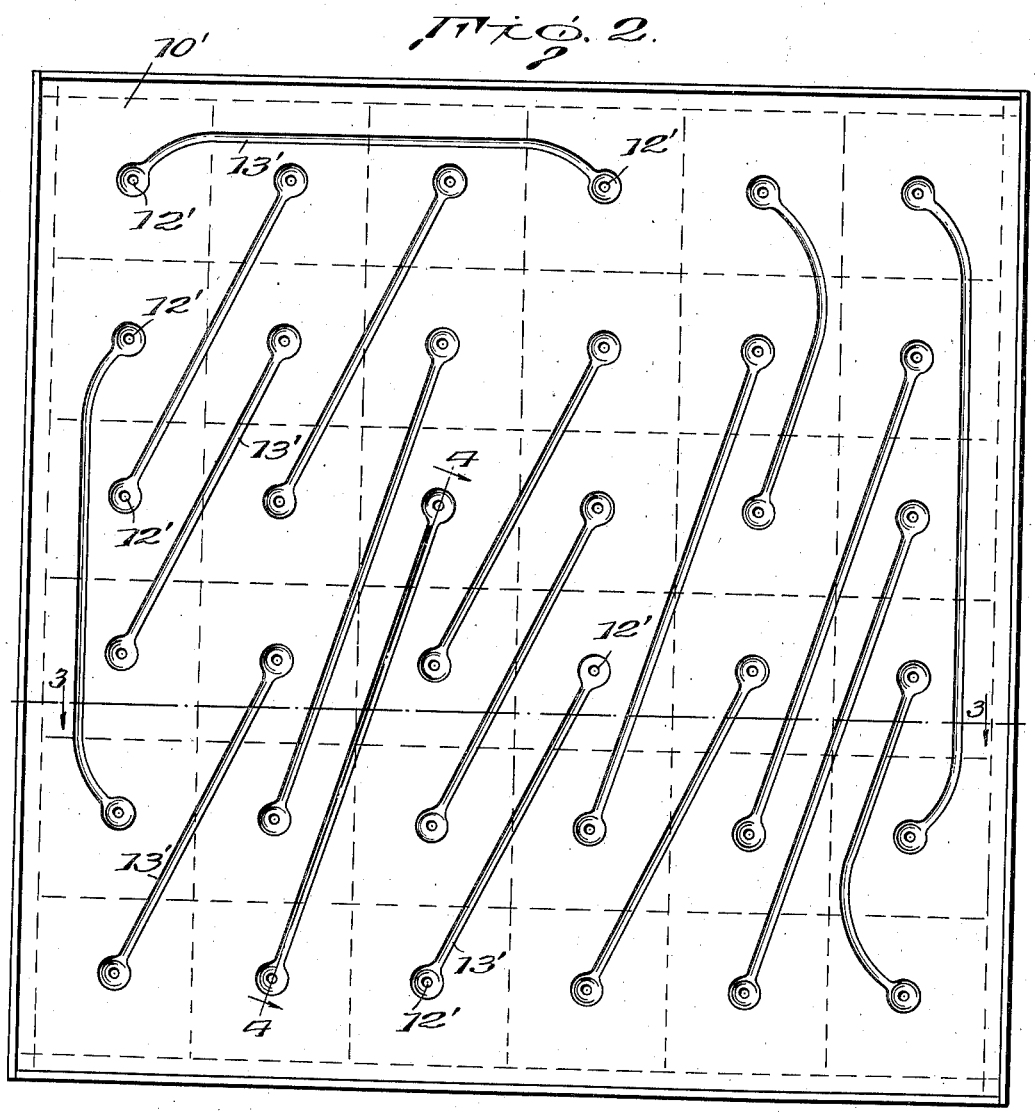
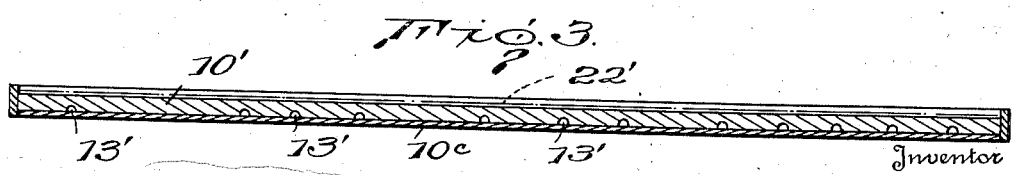
Inventor
Harry B. Palmer
By
Attorney Patented Feb. 20, 1940

2,190,881

UNITED STATES PATENT OFFICE 2,190,881

QUESTIONNAIRE GAME

Harry B. Palmer, New York, N. Y.

Application September 29, 1938, Serial No. 232,416

4 Claims. (Cl. 35—9)

The object of my invention is to supply in simple form a device, or apparatus, which though having the character of a plaything or toy and capable of affording entertainment or amusement, will be useful to impart information and so have value as a means of education. With such object in view my invention consists in what is defined by or is included within the terms or scope of the appended claims.

In the drawings:

Figure 2 is a bottom plan view of the base or board with the air channels therein exposed;

Figure 3 is a section on line 3—3 of Figure 2;

Figures 1, 4, 5, 6, 7:
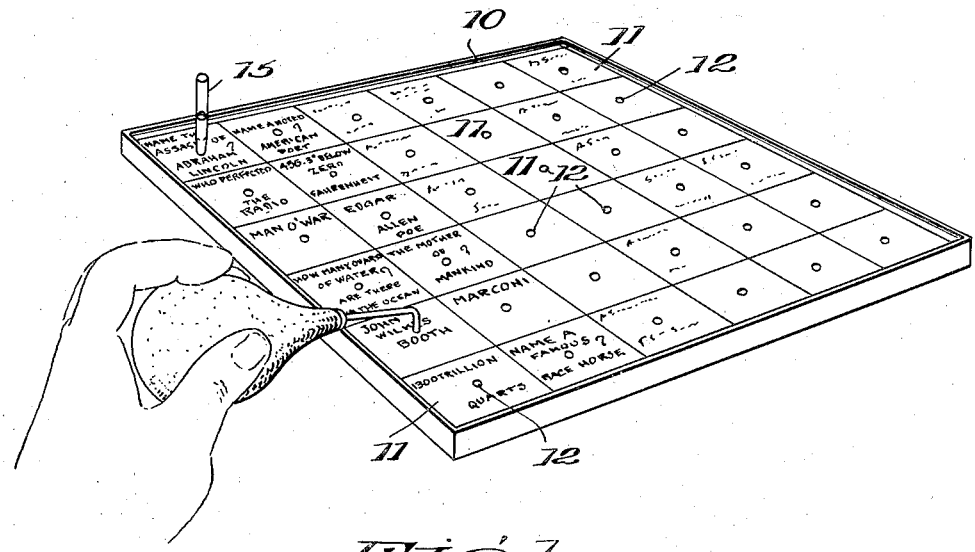
Figure 1 is a perspective view of apparatus embodying my invention and illustrating its manner of use.
Figure 4 is a section on line 4—4 of Figure 2.
Figure 5 is a detail view in longitudinal section of the blower or air-compressor for operating the air signal that may be used.
Figure 6 is a longitudinal section of the whistle form air signal.
Figure 7 is a like view of another signal device.

Apparatus embodying my invention, as shown in the drawings, comprises a board upon the top or face of which are printed or marked groups of questions and answers thereto, and pneumatic means that includes holes in the board, one for each question and one for the answer thereto, the holes for the question and the answer thereto being connected by a concealed passage or conduit so that air, introduced under pressure into the answer hole, will flow to the question hole and actuate a signal or indicating device applied to the question hole. There is but one signal device for all the question holes so that it may be applied to any one of the holes with the result that if the player introduces air under pressure to a question hole with which the signal is not connected, then the signal will not operate and the player will thereby know that he has not picked the correct answer. It is only when the signal operating air is caused to flow from the answer hole to the proper question hole that the signal will be sounded. Thus, if the question be "Name the assassin of Lincoln" and the signal device be applied to the hole contiguous pertaining to that question, and air as by means of a hand air compressor be forced in the hole contiguous to the name on the board "John Wilkes Booth" (which is, of course, the correct answer) then the signal will be sounded or actuated. Of course, if desired, the signal may be applied to the answer holes, and air to actuate it may be introduced into the question holes. If the game is played solitaire, the player himself applies the signal to a selected question or answer hole, or a teacher or another player may select the hole for the signal device. It will be evident that correct responses will be gratifying to the player and interest will be created by use of the attractive mechanical aids or means to produce the responses, especially in the case of boys. And at the same time, useful information will be imparted of historical, scientific and other facts and impressed on the memory.

Broadly describing the construction of the device as shown in the drawings, the board 10 shown is square and may be enclosed in a marginal rim or frame. Its top or face is suitably marked off by crossing lines with numerous square fields or areas 11 within each of which is printed a question or answer. At the center of each square 11 is a vertical hole 12 open to the top of the board and connected with a passage 13 that extends horizontally within the board. There is such a passage 13 that connects a selected pair of holes 12, that, respectively, are the holes for pertinent question and answer. The layout of one arrangement of the passages 13 is shown, in plan in Fig. 2, from which it will be seen that a number thereof must be bent or curved as they cannot run in straight lines directly between holes. This makes inconvenient the use of tubes attached to the board to supply the passage.

As a preferable construction, the board 10 has the passages 13 therein formed by cutting slots therethrough (by die stamping or other suitable method) and is interposed between top and bottom covers 10a and 10b to close and conceal the slots on opposite sides (Fig. 4). The board 10 and covers 10a and 10b have their contiguous faces tightly held together to permit air communication between the various passages. The board 10 and covers 10a and 10b may be made from card-board and, therefore, tightly fastened together by an adhesive. Where it is found necessary or desirable the ends of the slots, forming the passages 13, may be enlarged and circular, as at 14; and it will, of course, be understood that in this construction the squares 11 and holes 12 are provided on the top cover 10a.

The signal device may be, as shown in Figs. 1, 4, and 6, a simple tubular whistle 15 of familiar construction, pointed or tapered at its blowing end for easy and air-tight insertion into any one of the holes 12.

If desired, as shown in Fig. 7, the signal device may be a visual one, comprising a straight tube 16 with a tapering end for insertion in a hole and containing a light plunger 17 adapted, under air pressure, to move partially out of the tube at the top so as to be seen. A stop 18, such as a cross wire, spaced above the top of the tube will prevent complete emergence of the plunger 17.

The air compressor may be a simple valveless hand bulb 19 with an outlet tube 20 whose outer end is bent at a right angle to provide a nozzle 21 for convenient insertion in the air holes 12, as shown in Figs. 1 and 2. In such case, the retraction of air within the bulb, when hand pressure thereon is released, will return the plunger 17 into the tube 16 of the signal device shown in Fig. 7.

The questions and answers, and the lines to form the squares 11, may be printed or otherwise provided on the upper face of the board as shown in Fig. 1, and a number of other sheets 22 with different questions and answers, may be provided to be applied or laid over the upper face of the board for interchange or substitution in order that interest in this device may be continued and enlarged. These sheets 22, of course, will be perforated to provide holes to register with the board holes 12.

In Figures 2 and 3, there is shown a modified construction of the game board, which comprises the board proper 10' having the passages 13' depressed or molded in one face or side thereof which is closed by a cover 10c in an air-tight manner. Of course, the depressions in passages 13' may be either on the top or bottom face of the board 10', but is here shown on the bottom with the holes 12' extending through to its top face. Should the depressed passages 13' be on the top face of the board 10', the holes 12' would be provided in the cover 10c.

Having thus described the invention in the manner in which it is to be performed, it is to be understood that the invention is not to be limited to the form and construction as specifically described and shown, but may be varied and modified in numerous respects, which fall within the scope of the appended claims.

That which is claimed is:

1. In a game apparatus as set forth in claim 2, wherein the signal device comprises a tubular member having a tapered end to be fittedly inserted in any of said openings, a signal member reciprocably mounted in said tubular member and movable by said air pressure to rise above the outer end of said tubular member to give a visible signal, and means for limiting said last mentioned movement of the signal member whereby it may be returned to its normal position when the air pressure is relieved.

2. In a question and answer game apparatus, a board having a plurality of non-connecting air conducting passages formed within the same and having their end portions extending to different points in its area; openings in the board's surface, one opening at an end portion of each slot and communicating therewith; a manually portable air operated signal device having an interchangeable connection with any of said openings whereby the signal device is maintained in position, and a manually portable hand operated pneumatic pressure producing device having an interchangeable connection with any one of said openings, where upon proper selection of any pair of said openings air pressure may be transmitted to the signal device from said pressure producing device.

3. In a question and answer game apparatus, a board comprising an intermediate ply or layer having a plurality of non-connecting slots therethrough and having their end portions extending to different points in its area, cover plys or layers on opposite sides of said slotted ply to tightly close said slots to prevent air communication between said slots, openings in at least one of said covers permitting communicating with respective slots at the end portions thereof from the surface of said board, a manually portable air operated signal device to have an interchangeable connection with any one of said openings, whereby the signal device is maintained in position, and a manually portable hand operated pneumatic pressure producing device having an interchangeable connection with any one of said openings, where upon proper selection of any pair of said openings air pressure may be transmitted to the signal device from said pressure producing device.

4. In a game apparatus as set forth in claim 2, wherein the signal device comprises a tubular member having a tapered end to be fittedly inserted in any of said openings, and an air operated whistle means on the tubular member to give an audible signal.

HARRY B. PALMER.